No. 735,924. PATENTED AUG. 11, 1903.
C. A. P. VON WINKLER.
APPARATUS FOR COVERING HORSES' EYES.
APPLICATION FILED NOV. 28, 1902.
NO MODEL.
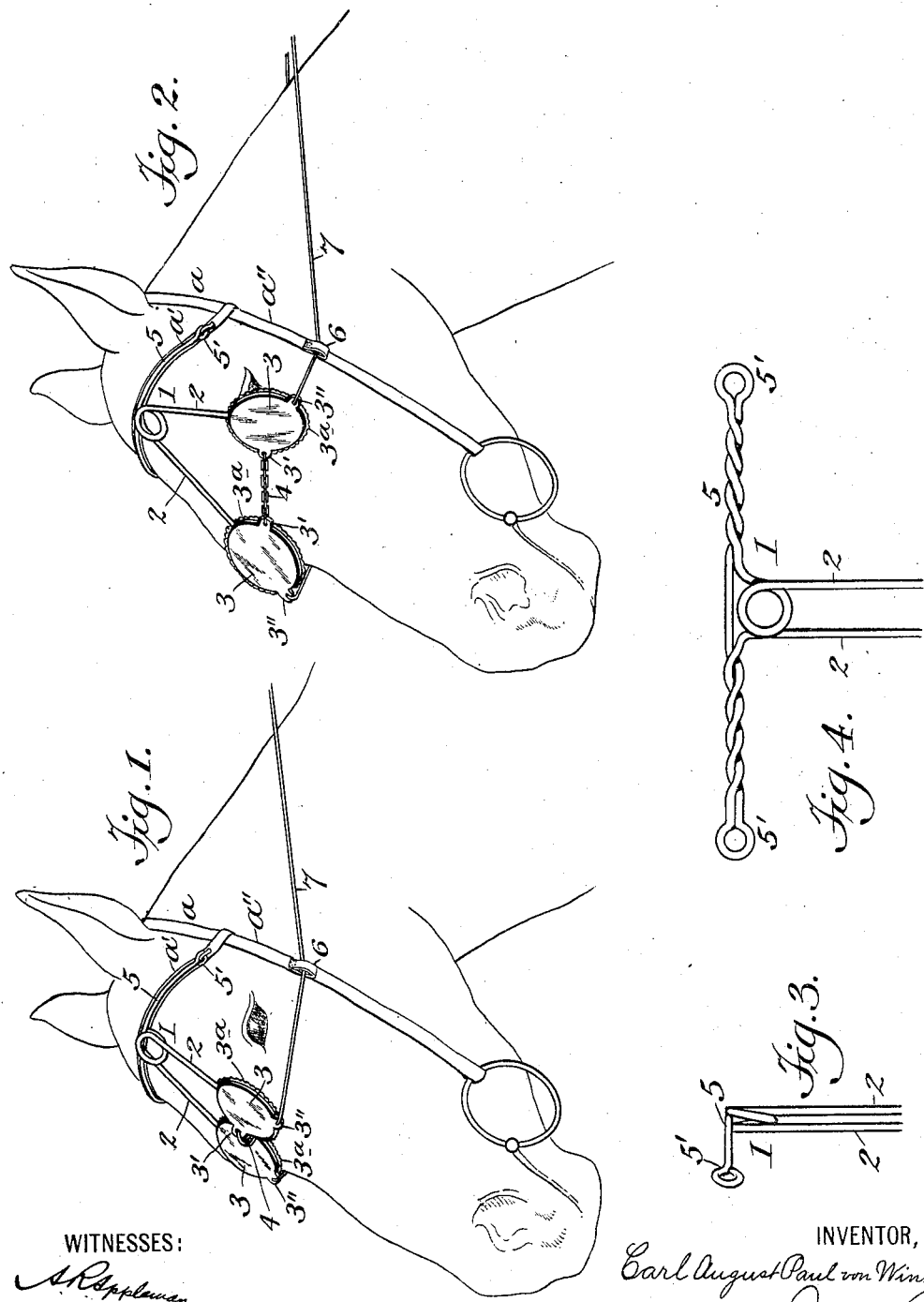
WITNESSES:
INVENTOR,
Carl August Paul von Winkler,
BY
ATTORNEY.

No. 735,924.

Patented August 11, 1903.

UNITED STATES PATENT OFFICE.

CARL AUGUST PAUL VON WINKLER, OF NEW YORK, N. Y.

APPARATUS FOR COVERING HORSES' EYES.

SPECIFICATION forming part of Letters Patent No. 735,924, dated August 11, 1903.

Application filed November 28, 1902. Serial No. 133,019. (No model.)

*To all whom it may concern:*

Be it known that I, CARL AUGUST PAUL VON WINKLER, a subject of the Emperor of Germany, residing at New York, in the county and State of New York, have invented certain new and useful Improvements in Apparatus for Covering Horses' Eyes, of which the following is a specification.

My invention relates to a device for covering horses' eyes; and the purpose and object of the use thereof are to provide for the safety of riders carried or passengers drawn by horses, especially by such as are known or supposed to be fractious or restive when driven. Such horses at times seriously imperil the physical safety and even the lives of riders or passengers, and it is a well-known fact that such animals are generally of a quiet and gentle disposition and readily managed so long as they see no object which frightens them; but upon the appearance of anything of unusual aspect they become terror-stricken and cannot be controlled, frequently running away or shying and throwing their riders or the passengers in the vehicles drawn by said animals and also breaking said vehicles and the harness, besides maiming or killing themselves.

It can be demonstrated that horses whose eyes are so covered that they cannot see before them may easily be managed and either brought to a full stop or be safely driven past any object, however frightful the latter may be; but inasmuch as it is desirable that horses should be able to use their eyes under all normal conditions of travel I have made this invention, which will enable a rider or driver to either permit the ridden or driven horse to use his eyes under normal conditions or prevent him from doing so when he is frightened or under conditions which may cause him to become frightened.

A full and complete description and illustration of my invention will be found in this specification and in the drawings which accompany and form a part thereof.

In the drawings, Figure 1 is a front elevation of the device in its inoperative form. Fig. 2 is a similar view thereof when said device is in operation. Fig. 3 is a side elevation of the device as shown in Fig. 2, and Fig. 4 is a front elevation of a constructive modification of the device.

Corresponding parts in all the figures are denoted by the same reference characters.

Referring to the drawings, 1 designates a framework, preferably made of wire and of which at least the depending members 2 2 should be made of resilient material. The members 2 are preferably formed integrally and helically coiled at their point of divergence, thus increasing their resiliency, and to the lower end of each is rigidly attached a plate 3, preferably of a general circular form, to which are attached loops 3' 3" and at the inner part of the periphery of the plate and near the lower part thereof. To the loops 3' is attached a flexible connection, preferably a chain 4. The plates 3 should be slightly out of alinement, but parallel one with another and also parallel with a cross-bar 5, at each end of which a loop 5' is formed. The inner face of each plate 3 may be covered with cloth, felt, or other suitable material, and the edges of the latter may be scalloped or nicked, as at 3ª. The cross-bar 5 should be attached, by means of the loops 5', to the front strap $a'$ of a headstall $a$ or to some other suitable device which may be secured on a horse's forehead.

On each cheek-strap $a''$ of the headstall $a$ a fair leader or ring 6 is suitably positioned, and the ends of a line or strap 7 respectively pass therethrough to each loop 3".

The operation and advantages of my invention will be readily understood by those skilled in the art to which it appertains. The device being suitably attached to a headstall, as before mentioned, and the latter being secured to a horse's head in the usual manner, the plates 3 will under normal conditions remain in the positions shown in Figs. 1 and 4, and the bight of the line 7 may be held by the rider or driver of the horse. Should the horse become restive or frightened or should there be indications of occurrences tending to frighten the horse, the driver may pull the line 7, which will render, near each end thereof, respectively, through the fair-leaders 6 and cause the plates 3 to separate as far as the chain 4 will permit, which will be sufficiently to bring them respectively in front of the eyes of the horse, thus preventing him from seeing any object which may otherwise frighten him, and he may either be driven with safety past such objects or stopped, as the driver may deem best.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

Having thus described my invention, I claim and desire to secure by Letters Patent—

1. A device for covering horses' eyes, comprising a wire frame with depending spring-arms, plates fixed to the lower ends of said arms, and flexible means connecting said plates and limiting the distance which they may be separated.

2. A device for covering horses' eyes, comprising a wire frame with a cross-bar at its upper extremity, spring-arms depending from said cross-bar, overlapping plates fixed at the lower ends of said arms, and flexible means secured to said plates for limiting the distance which they may be separated.

In testimony whereof I have signed my name in the presence of the subscribing witnesses.

CARL AUGUST PAUL VON WINKLER.

Witnesses:
CHAS. H. DAVIDS,
J. C. PYBAS.